Aug. 14, 1956     C. R. PHIPPS     2,758,592
HEATED FISHING ROD HANDLE
Filed April 13, 1953
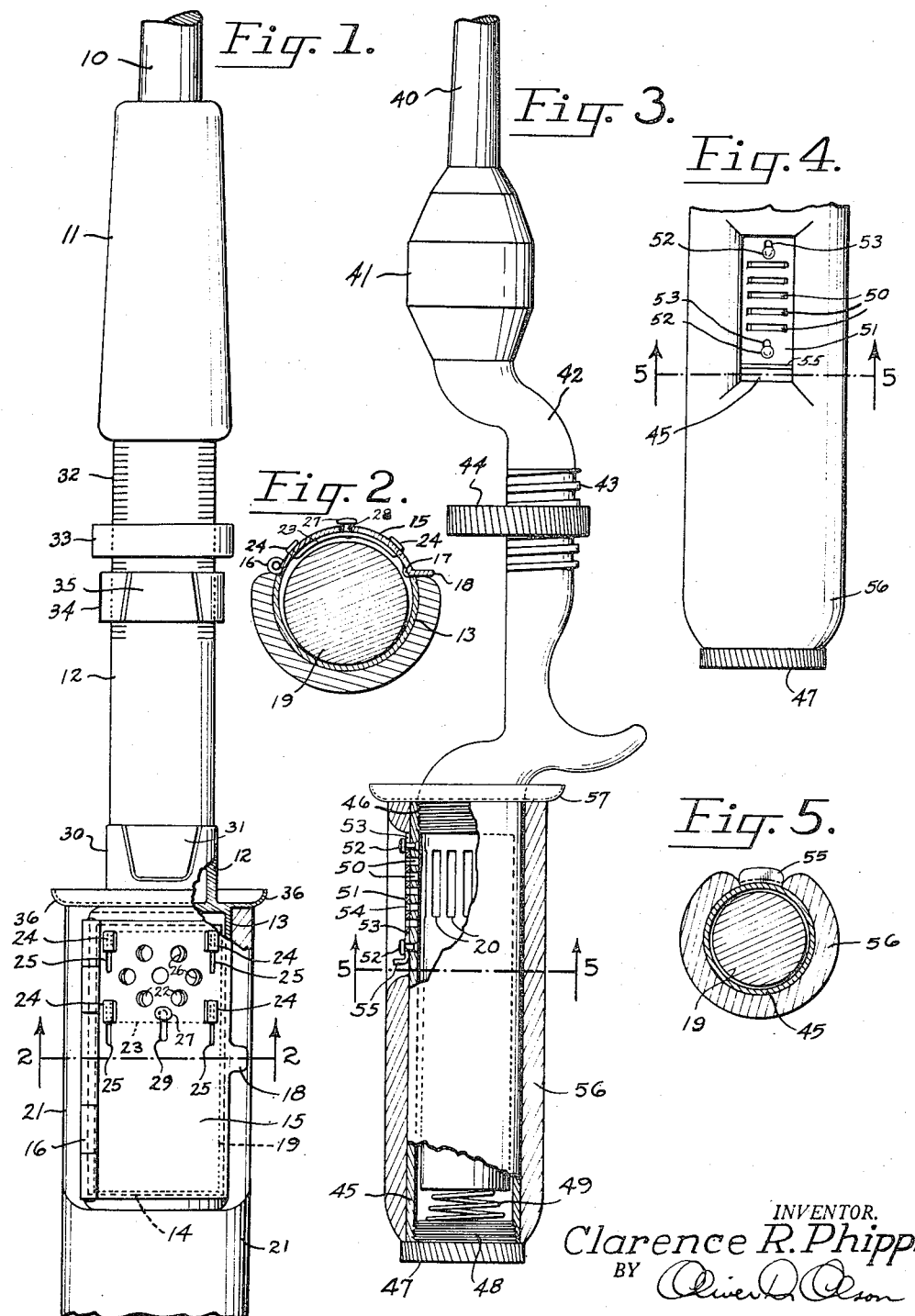
INVENTOR.
Clarence R. Phipps
BY
Agent

United States Patent Office 2,758,592
Patented Aug. 14, 1956

2,758,592

HEATED FISHING ROD HANDLE

Clarence R. Phipps, Portland, Oreg.

Application April 13, 1953, Serial No. 348,184

2 Claims. (Cl. 126—208)

This invention pertains to fishing rod handles, and relates particularly to a fishing rod handle constructed in such manner as to be capable of being heated, whereby to afford comfort to the fisherman during cold weather.

It is a principal object of the present invention to provide a fishing rod handle constructed to receive removably within said handle a heating element adapted to provide heat to the handle surface.

Another important object of this invention is the provision of a fishing rod handle constructed to receive a heating element therein and adapted to convey heat from said element to the reel seat of the fishing rod, whereby to maintain the reel in freely lubricated condition for optimum performance.

A further important object of the present invention is the provision of a fishing rod handle constructed to receive a heating element therein, the handle having means incorporated therewith for regulating the heat of the said heating element, whereby to permit adjustment of the heat to the desires of the user.

A still further object of the present invention is the provision of a heated fishing rod handle of simplified construction for economical manufacture, which is efficient in operation, and is operable with maximum facility.

These and other objects and advantages of the present invention will appear from the following detailed description taken in connection with the accompanying drawings, in which:

Figure 1 is a fragmentary plan view of a fishing rod handle having incorporated therewith means for heating said handle in accordance with the present invention;

Figure 2 is a sectional view taken along the lines 2—2 in Figure 1 and showing details of the construction by which to accommodate a heating element within the fishing rod handle;

Figure 3 is a fragmentary side elevation of a different form of fishing rod handle and illustrating a modified construction of the handle by which a heating element is incorporated therewith;

Figure 4 is a fragmentary plan view of the rearward portion of the handle shown in Figure 3; and Figure 5 is a sectional view taken along the lines 5—5 in Figures 3 and 4.

Considered in its broad aspects, the heated fishing rod handle of the present invention involves the provision of a hollow handle having a metal liner therein defining a chamber adapted to receive a heating element therein, the metal liner being secured in heat conductive relation with a metal reel seat forming a part of the fishing rod.

Referring to Figures 1 and 2 of the drawing, there is shown in slightly enlarged view a fishing rod 10 extending at its lower end through a cork ferrule 11 and secured to a metal tubular reel seat 12. The opposite end of the reel seat is secured to a metal cylinder 13, shown in the modifications of Figures 1 and 2 as being of larger diameter than the reel seat. The end of cylinder 13 opposite the reel seat 12 is preferably closed by wall 14.

As best shown in Figure 2 of the drawings, the cylinder 13 is cut away for a substantial distance between its ends and is provided with an arcuate door 15 which, when closed, completes the circular cross section of the cylinder 13. The door is pivotally secured to the cylinder by means of the hinge 16 which interconnects the adjacent edges of the cylinder and door. One or more catch lugs 17 is provided on the door adjacent the opposite edge thereof for snap engagement with the adjacent edge of the cylinder 13 for purposes of securing the door in closed position. A finger latch 18 projects outwardly from the door on the side opposite hinge 16 to facilitate opening of the door 15.

It is to be noticed that the cylinder 13 is cut away for the door 15 a distance slightly less than the diameter of the cylinder. This construction is preferred in order that the cylinder may receive through the door opening a heating element 19 of as large a size as is practicable. The heating element is of construction well-known in the art and is preferably of the type that employs a wick which is fed with lighter fluid contained in a chamber filled with a fluid absorbent material. The wick is ignited with a flame but does not burn with a flame. The wick merely glows, substantially invisibly, by the combustion of the fluid as the vapors of the latter mix with air drawn in through the air ports 20 provided in the heating element.

The cylinder 13 forms the structural support for at least the hand grip portion of the handle of the fishing rod. That is to say, the cylinder need not extend the full length of the handle, as in the construction illustrated in Figure 1, the structural support for the remaining length of the handle constituting, for example, a wooden plug. In any event, the structural support of the handle is usually covered with a cork sheathing 21. This sheathing is cut away in the area of the door 15 to permit operation of the latter.

The door 15 is provided with a plurality of openings 22, preferably positioned in proximity to the air ports 20 of the heating element 19. A plate 23, curved to the radius of the door, is positioned adjacent the under side of the door and secured to the latter for limited sliding movement longitudinally of said door. One construction accommodating this action is illustrated in the drawings, wherein the plate 23 is shown to be provided with tabs 24 extending upwardly from the corners of the plate through slots formed in the door 15. These tabs are bent over on the outer side of the door, whereby to secure the plate in position with respect to said door.

The plate 23 is also provided with openings 26 arranged for cooperative registration with the openings 22 when the plate 23 is in one position of adjustment. It is to be noted that the slots 25 are substantially longer than the width of the tabs 24 in order that the plate 23 may be moved longitudinally of the door for purposes of effecting misalignment of the openings 22 and 26, for purposes to be explained in detail hereinafter. The movement of plate 23 is facilitated by means of a finger button 27 secured to the plate by means of the stem 28 which extends through a slot 29 in the door 15.

The reel seat 12 is of conventional construction, being provided at the handle end with a collar 30 having an outwardly offset portion 31 which provides an underlying space for receiving one end tongue of a reel (not shown), and provided at the opposite end with a threaded section 32. This threaded section carries a threaded collar 33. A sleeve 34 is mounted slidably upon the reel seat 12 and has an upwardly offset portion 35 providing an underlying space for receiving the opposite tongue of the reel. The sleeve 34 operates in conjunction with the threaded collar 33, the latter functioning by being threaded toward the collar 30 to secure the reel firmly to the reel seat.

In view of the provision of the openings 22 and 26 in the door 15 and plate 23, respectively, there is preferably provided means for preventing water from flowing off of the fishing line reeved about the reel onto the door and through said openings. Such means is illustrated in the drawings by the disc-shaped shield 36 secured to the reel seat in between the door 15 and the collar 30. By means of this shield water flowing from the fishing line is diverted downwardly away from the openings communicating with the chamber containing the heating element 19.

The procedure for heating the fishing rod handle described hereinbefore is as follows: The door 15 is opened and the heating element 19 is removed for purposes of lighting the same, in well-known manner. With the heating element ignited, the same is replaced within the cylinder 13 and the door 15 is snapped shut. The fisherman then regulates the degree of opening between the openings 22, 26 by sliding the plate 23 by means of the finger button 27. In this manner the amount of heat generated in the heating element may be regulated by controlling the supply of air to the heating element, thereby regulating the temperature of the fishing rod handle to the comfort of the fisherman.

The heat generated by the heating element 19 not only heats the cylinder 13, but the heat is also conducted from the cylinder to the reel seat 12. The reel seat, in turn, conducts the heat through the metal tongues and framework of the reel, and thus the lubricant for the moving parts of the reel is maintained at a warm temperature and the reel is kept in optimum working condition under all kinds of weather conditions.

The modification illustrated in Figures 3, 4 and 5 of the drawings is shown applied to a different type of fishing rod. This rod comprises the rod 40 whose lower end extends through ferrule 41 and is secured to one end of the reel seat 42. The reel seat is offset intermediate its ends, the offset portions being provided with threads 43 which carries the threaded collar 44. The collar functions in well-known manner to secure a reel (not shown) to the said reel seat.

The end of reel seat 42 opposite the rod 40 is secured to one end of a metal cylinder 45, as by the cooperating threads 46. If preferred, the reel seat and cylinder may be formed as an integral structure. The end of cylinder 45 opposite the reel seat connection is releasably closed by cap 47 which is secured to the cylinder by means of the threaded shoulder 48 engaging the internally threaded section of the cylinder. The heating element 19, previously described, is receivable within the hollow cylinder 45 through the cap end of the latter. The heating element is preferably maintained in abutment with the threaded end of the reel seat by means of the coil spring 49 secured to the cap 47, as shown in Figure 3.

A plurality of openings 50 are provided in the cylinder 45, preferably in the proximity of the openings 20 of the heating element 19. An overlying plate 51, curved to the contour of the outer surface of the cylinder 45, is secured to the latter for limited longitudinal sliding movement with respect thereto. This construction is achieved, for example, by means of the rivets 52 secured to the cylinder and extending through longitudinal slots 53 provided adjacent the opposite ends of the plate 51. The plate 51 is also provided with openings 54 proportioned and arranged for cooperative registration with the openings 50 in one position of adjustment of the plate 51. An upstanding finger catch 55 on the plate 51 serves to facilitate movement of the plate to varying degrees of registration of the openings 50, 54 for the purpose explained in detail hereinbefore.

The cylinder 45 is covered with a cork sheathing 56, in conventional manner. The sheathing is cut away in the area of plate 51 to permit movement of the latter and to leave the openings 50, 54 exposed to the atmosphere for drawing air into the chamber containing the heating element 19.

Water is prevented from flowing off of the fishing line reeved about the reel through the openings 50, 54 by the provision of the disc shield 57 secured between the reel seat and the cylinder 45, substantially in the same manner as previously described.

The operation of the construction illustrated in Figures 3, 4 and 5 is substantially the same as in the modification of Figures 1 and 2, the removal and installation of the heating element 19 constituting the primary differences in construction. The heating element is removed by first unscrewing the cap 47 and allowing the heating element to slide out through the open end of the cylinder 45. The heating element is then ignited in the manner previously explained and reinserted in the cylinder and secured against longitudinal displacement by the coil spring 49 upon installation of the cap 47. The fisherman adjusts the position of openings 54 with respect to openings 50 by manipulation of the plate 51 to obtain the degree of warmth desired, in the manner explained hereinbefore. While simultaneously heating the handle and the hand of the fisherman, the heat from the element 19 is conducted from the metal cylinder 45 through the metal reel seat 42 and framework of the reel supported thereby to warm the lubricant employed in the reel and thereby maintain optimum working condition of said reel.

From the foregoing it is believed to be apparent that the present invention provides a fishing rod handle which affords a degree of comfort and convenience to the fisherman not heretofore provided. By incorporation of the heating element within the handle of the fishing rod, the fisherman is provided with means by which to maintain his hands at a comfortable temperature in all conditions of weather without limiting the activity of the fisherman. That is to say, the fisherman may continue his sport in comfort and with complete freedom of his hands to perform the various tasks and maneuvers required in fishing. Moreover, the construction described hereinbefore provides for the simultaneous heating of the reel seat and reel to maintain the latter in optimum working condition under all conditions of adverse weather. This is an important advantage of the present invention, for it thereby maintains the operating characteristics of the reel substantially constant regardless of weather conditions.

It will be apparent to those skilled in the art that various changes may be made in the details of construction described hereinbefore without departing from the scope and spirit of the present invention. For example, other mechanical arrangements may be provided by which to regulate the entrance of air to the chamber containing the heating element 19. The heating element may be of any type desired, such as chemical heaters, charcoal sticks and others. The arrangement by which the door 15 is mounted upon the cylinder 13 may also be changed in any manner desired. For example, the door may be secured releasably along both side edges by such means as snap catches, rather than by the hinge arrangement illustrated and described hereinbefore. The use of cork as a sheathing material for fishing rod handles is well-known and is shown herein merely for purposes of illustration. It will be recognized that other sheathing materials, such as leather or wood may be substituted for the cork if desired, and that no sheathing material need be provided if not desired.

The foregoing and other changes may be made within the scope of this invention. Accordingly, it is to be understood that the foregoing is merely illustrative of the invention and is not to be considered in a limiting sense.

Having now described my invention and the manner in which the same may be used, what I claim as new and desire to secure by Letters Patent is:

1. In combination, a fishing rod handle comprising a metal reel seat, a hollow metal cylinder mounted on the rearward end of the reel seat in heat conducting relationship therewith, a heating element capable of being ignited at one end and adapted to be contained within the hollow cylinder with the ignitable end positioned adjacent the reel seat, the metal cylinder having an adjustable opening in the side wall thereof positioned in proximity to the ignitable end of the heating element for regulating the admittance of air to said ignitable end.

2. In combination, a fishing rod handle comprising a metal reel seat, a hollow metal cylinder mounted on the rearward end of the reel seat in heat conducting relationship therewith, a heating element capable of being ignited at one end and adapted to be contained within the hollow cylinder with the ignitable end positioned adjacent the reel seat, the metal cylinder having an adjustable opening in the side wall thereof positioned in proximity to the ignitable end of the heating element for regulating the admittance of air to said ignitable end, and an outwardly projecting water shield mounted between the reel seat and said adjustable opening.

UNITED STATES PATENTS

References Cited in the file of this patent

| | | |
|---|---|---|
| 188,857 | Clay | Mar. 27, 1877 |
| 835,150 | Bowditch | Nov. 6, 1906 |
| 1,485,979 | Gurr | Mar. 4, 1924 |
| 2,152,385 | Mayer et al. | Mar. 28, 1939 |
| 2,523,361 | Farnham | Sept. 26, 1950 |
| 2,526,293 | Stark | Oct. 17, 1950 |
| 2,579,087 | Organ | Dec. 18, 1951 |
| 2,646,640 | George | July 28, 1953 |

FOREIGN PATENTS

| | | |
|---|---|---|
| 25,347 | Great Britain | A. D. 1896 |
| 180,961 | Germany | Feb. 22, 1907 |
| 366,362 | Great Britain | Feb. 4, 1932 |